(12) United States Patent
Kölhi et al.

(10) Patent No.: US 9,313,137 B2
(45) Date of Patent: Apr. 12, 2016

(54) METHOD AND ARRANGEMENT FOR THE POWER MANAGEMENT OF A DIGITAL COMMUNICATION LINE

(71) Applicant: TELEFONAKTIEBOLAGET L M ERICSSON (PUBL), Stockholm (SE)

(72) Inventors: Johan Kölhi, Vaxholm (SE); Per-Erik Eriksson, Stockholm (SE); Miguel Berg, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/055,504

(22) Filed: Oct. 16, 2013

(65) Prior Publication Data
US 2014/0036684 A1      Feb. 6, 2014

Related U.S. Application Data

(63) Continuation of application No. 12/933,821, filed as application No. PCT/SE2009/050147 on Feb. 11, 2009, now Pat. No. 8,699,363.

(60) Provisional application No. 61/042,327, filed on Apr. 4, 2008.

(51) Int. Cl.
*H04L 12/801* (2013.01)
*H04L 12/10* (2006.01)
(Continued)

(52) U.S. Cl.
CPC ............... *H04L 47/29* (2013.01); *H04L 12/10* (2013.01); *H04L 12/12* (2013.01); *H04L 12/185* (2013.01); *H04L 12/2874* (2013.01);
(Continued)

(58) Field of Classification Search
CPC ......... H04L 47/29; H04L 12/10; H04L 12/12; H04L 12/185; H04L 12/2874; H04L 12/1881; H04M 11/062; Y02B 60/34; Y02B 60/36
USPC ........................................................ 370/252
See application file for complete search history.

(56) References Cited

U.S. PATENT DOCUMENTS 6,061,427 A   5/2000 Ryoo
6,690,721 B1  2/2004 Murphy et al.
(Continued)

FOREIGN PATENT DOCUMENTS

WO    WO 2007146048 A2 * 12/2007

OTHER PUBLICATIONS

George Ginis: "Low-Power Modes for ADSL2 and ADSL2+". XP-002524987. Jan. 2005.
(Continued)

*Primary Examiner* — Melvin Marcelo

(57) ABSTRACT

The present invention relates to a method and an arrangement for the power management of a digital communication line such as a digital subscriber line DSL (2201). A problem addressed by the invention is that the transitioning of the digital subscriber line (2201) from a low transmission power state to a high transmission power state can cause disturbance to adjacent lines. This problem is solved by the current invention by an access node AN (2100) that is arranged to step-wise increase the power state until the high transmission power state has been reached. The invention also comprises embodiments of monitoring and detecting traffic events that serve as triggers of the transitioning.

14 Claims, 7 Drawing Sheets

(51) Int. Cl.
   *H04L 12/12*   (2006.01)
   *H04L 12/18*   (2006.01)
   *H04L 12/28*   (2006.01)
   *H04M 11/06*   (2006.01)

(52) U.S. Cl.
   CPC ........ *H04M 11/062* (2013.01); *H04L 12/1881* (2013.01); *Y02B 60/34* (2013.01); *Y02B 60/36* (2013.01)

(56) References Cited

U.S. PATENT DOCUMENTS

| | | |
|---|---|---|
| 7,406,117 B2 | 7/2008 | Bella et al. |
| 7,961,750 B2 | 6/2011 | Kolhi |
| 8,275,344 B2 | 9/2012 | Schwager |
| 8,385,509 B2 | 2/2013 | Zhou |
| 2006/0073805 A1 | 4/2006 | Zumkeller et al. |
| 2007/0009020 A1 | 1/2007 | Warrier et al. |
| 2010/0254380 A1 | 10/2010 | Clausen |
| 2013/0208876 A1 | 8/2013 | Kuipers |

OTHER PUBLICATIONS

ITU-T: "Asymmetric digital subscriber line transceivers 2 (ADSL2)". Series G. G992.3 (Jan. 2005).
ITU-T, Telecommunication Standardization Sector of ITU, G.992.3 Series G: Transmission Systems and Media, Digital Systems and Networks; Digital sections and digital line system—Access networks; Asymmetric digital subscriber line transceivers 2 (ADSL2); Jan. 2005.

* cited by examiner

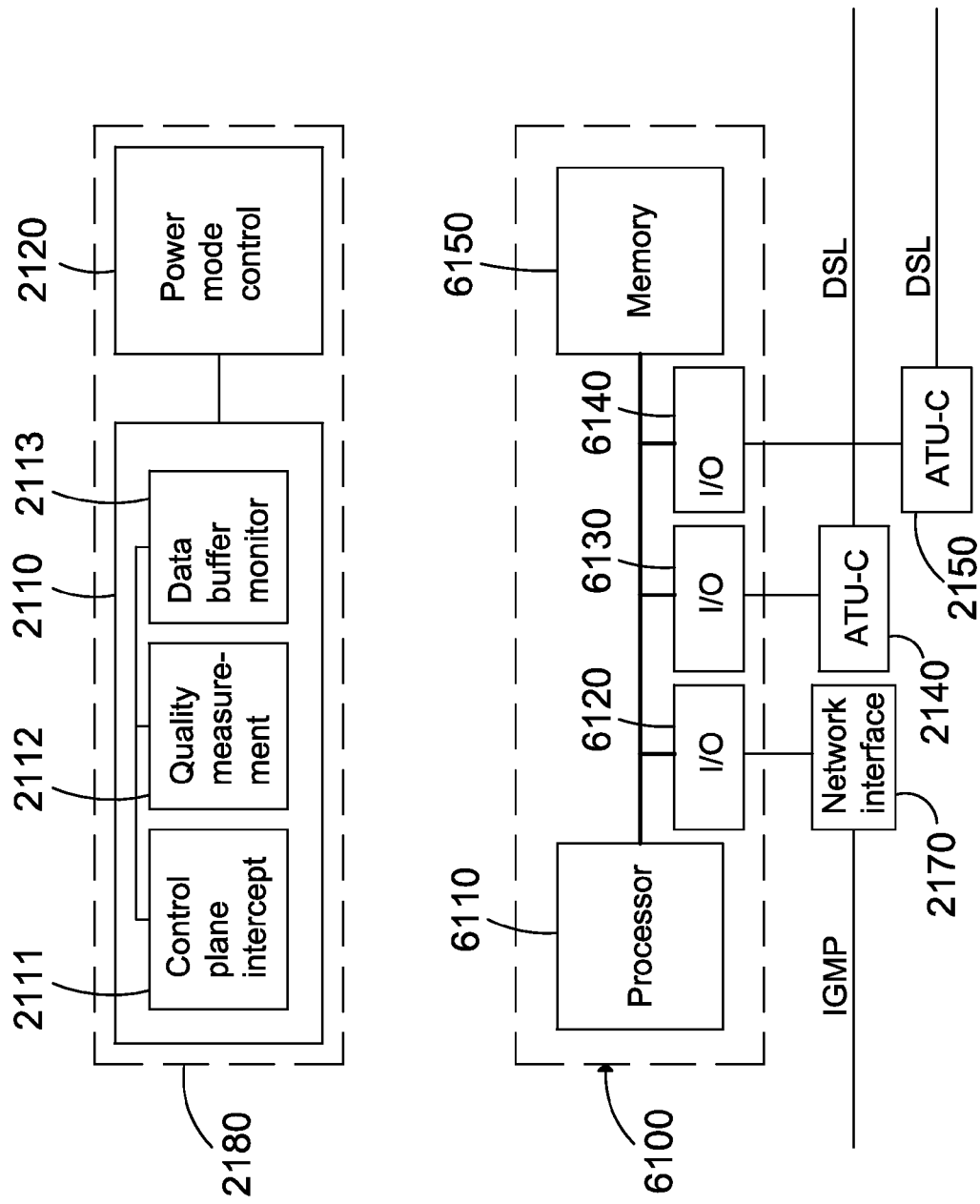

US 9,313,137 B2

METHOD AND ARRANGEMENT FOR THE POWER MANAGEMENT OF A DIGITAL COMMUNICATION LINE

CROSS-REFERENCE TO RELATED APPLICATIONS

This application is a continuation of U.S. application Ser. No. 12/933,821, filed Oct. 13, 2010, which was the National Stage of international Application No. PCT/SE2009/050147, filed Feb. 11, 2009, the disclosures of which are incorporated by reference.

TECHNICAL FIELD OF THE INVENTION

The present invention relates to a method and an arrangement for the power management of a digital communication line such as a digital subscriber line.

DESCRIPTION OF RELATED ART

The internet has been an important driver to introduce broadband access to homes and small offices. Broadband technologies such as DSL (Digital Subscriber Line) are installed in millions of homes around the world and the number of broadband subscribers is constantly increasing. With DSL, data, television and telephone services can be provided over the same access.

The technology behind digital subscriber lines has constantly been improved. With the introduction of the second generation of ADSL, ADSL 2 (Asymmetric Digital Subscriber Line 2) also power saving features have been introduced. Power savings can be applied when no or very little data is sent over the subscriber line. One example is when a TV set is powered off at night time. The international patent application with the publication number WO2007/139458 discloses a method for a STB, Set Top Box connected to the TV set to detect when the TV set is deactivated. The STB sends a so called IGMP leave report signal to an access node AN which then can take actions.

In ITU-T's Recommendation G.992.3 of January 2005, a power saving feature for ADSL 2 is disclosed. In G.992.3 the digital subscriber line can have three different power management states, L0, L2, L3 where L0 is Full On, L2 is Low Power and L3 is Idle. The transitioning between the different power management states are triggered by primitives that can originate from various sources. One source could for example be the Set Top Box described above. The transitioning from the low power state L2 to the Full On state L0 is normally done when there is a need to send data at a bandwidth that is greater than the available bandwidth in low power state L2. For example, it can be necessary to transition from the L2 state to the L0 state when the STB mentioned above detects that the TV set is activated again.

In G.992.3 the transitioning from the low power state L2 to the Full On state L0 is made in one step. Likewise, U.S. Pat. No. 6,850,539 discloses a method and arrangement for a transition from a low power state to a high power state in an ADSL system.

A disadvantage when transitioning from the low power state to the high power state is that it can affect adjacent lines due to cross-talk coupling between the copper pairs. Bit-errors and even loss of synchronization on the adjacent lines can be the result. This would in turn degrade the Quality of Service (QoS) for services like IPTV, Voice over IP (VoIP) etc. This is further the reason why only a few network operators use the Low Power State L2 in their ADSL systems today. Not using the L2 option does consequently also mean an unnecessary waste of power in the ADSL systems.

SUMMARY OF THE INVENTION

The present invention relates to a problem how to transit from a low transmission power state to a high transmission power state on a digital communication line (such as a digital subscriber line, DSL) avoiding the disadvantages mentioned above.

The invention comprises a method for transitioning the digital communication line connected between a first node (such as an access node AN) and a second node (such as a network termination NT) from the low transmission power state to the high transmission power state by increasing the transmission power in the first node in a plurality of steps. This is done by having the first node sending a plurality of consecutive requests to the second node where the first node is asking 'permission' from the second node to increase the transmission power. The second node sends responses back to the first node where these responses for example include a grant or reject of the requested power increase. These requests and responses are exchanged between the first and the second node until the high transmission power state has been reached. The transitioning is triggered by monitoring and detecting a selected traffic event by a traffic event monitor in the first node. As for example, one traffic event is that a threshold in a transmission buffer in the first or the second node has been passed. Another example is when a selected call control message is received.

The invention also comprises a first node (such as an Access Node) that is connectable to the second node (i.e. the Network Terminal, NT) over the digital communication line. The first node comprises a traffic event monitor arranged to monitor and to detect selected traffic events and a power mode control unit arranged to send the requests and to receive the responses and to increase the transmission power level in the first node.

An advantage with the current invention is that the stepwise increase of the transmission power results in less disturbance of the adjacent communication lines. This disturbance can be minimized by carefully selecting power state transitioning parameters (e.g. the value of the steps for power increase and the value of the time between sending consecutive requests). This advantage in turn means that the possibility to change between the low transmission power state and the high transmission power state and vice versa will be used more frequently, which in the end will reduce the power consumption.

The objective with the current invention is therefore to provide a method and an apparatus to make it possible to benefit from the option to use a low transmission power state whenever this is possible.

The invention will now be described in more detail and with preferred embodiments and referring to accompanying drawings.

BRIEF DESCRIPTION OF THE DRAWINGS

FIG. 6 is a block diagram illustrating an embodiment of the means for traffic monitoring and power mode control.

DETAILED DESCRIPTION OF EMBODIMENTS

Figure 1A:
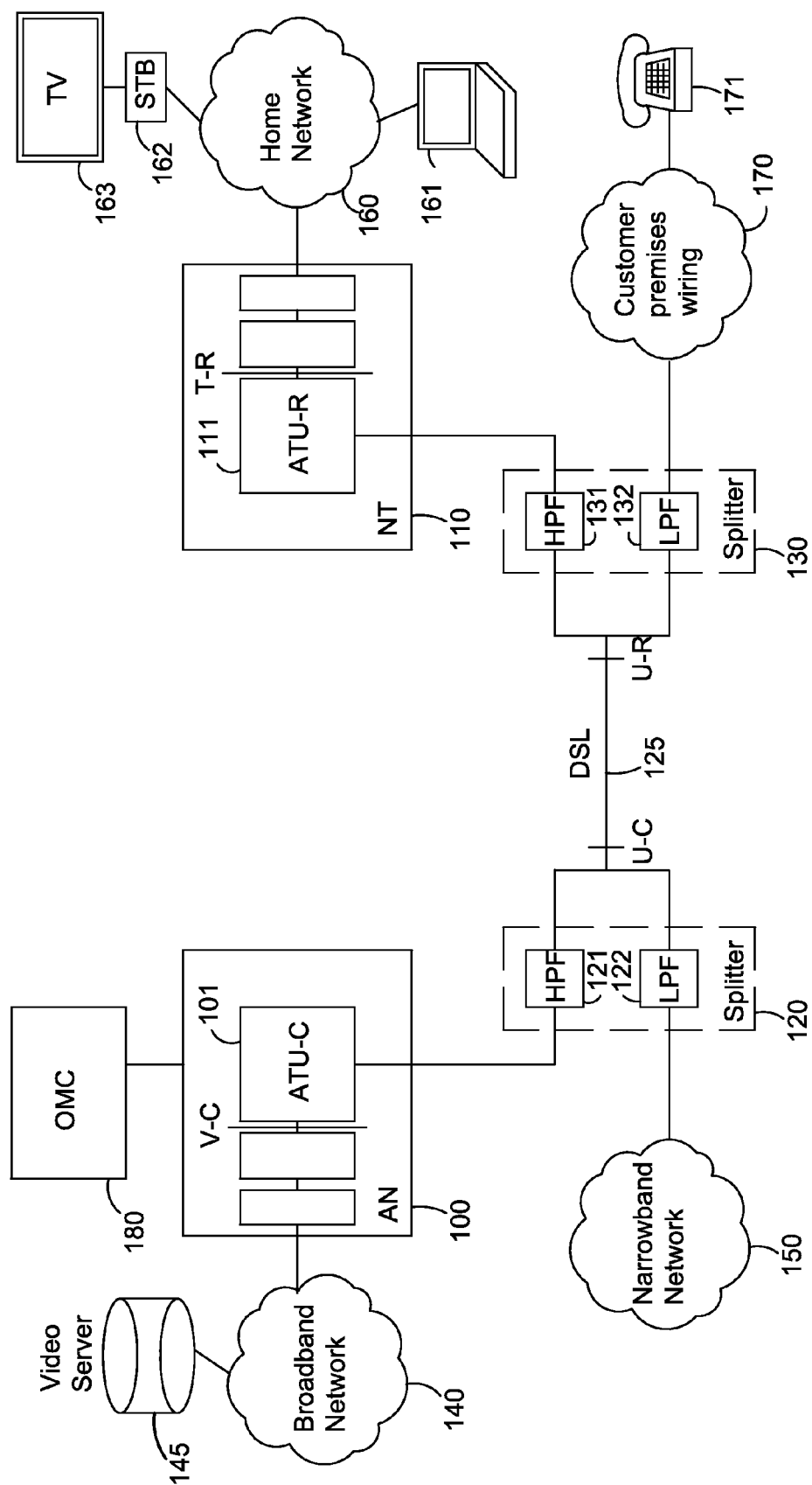
FIG. 1a is a block diagram illustrating a generic reference model for an ADSL system.

FIG. 1a illustrates a generic reference model for an ADSL system with splitter. The system comprises an access node AN 100 connected to a network terminal NT 110 via a digital subscriber line DSL 125 which normally is a two-wired twisted copper pair.

As the subscriber line DSL 125 is designed to carry both traditional telephony from a narrowband network 150 and a data channel from a broadband network 140 it carries two line signals, one for voice and one for data. To combine and to extract the two line signals, two splitters 120, 130 are located close to the AN 100 and the NT 110 respectively. Each splitter 120,130 comprises a high pass filter HPF 121, 131 and a low pass filter LPF 122, 132. The high pass filter HPF 121, 131 passes the line signal for data, but attenuates the line signal for voice. The low pass filter LPF 122, 132 passes the line signal for voice, but attenuates the line signal for data. The voice signal coming from the narrowband network 150 is guided to a customer premises wiring 170 having for example a plain old telephone set 171, and the data signal from the broadband network 140 is guided to a home network 160 through the NT 110. As an example, the home network 160 in FIG. 1 comprises a laptop 161 and a TV set 163 connected to the NT 110 via a set top box STB 162. The functionality of the set top box STB 162 can alternatively be integrated in the TV set 163.

Each of the nodes, the AN 100 and the NT 110, comprises an ADSL Transceiver Unit ATU 101,111 connected to the digital subscriber line DSL 125 via the high pass filters HPF 121, 131. The ADSL Transceiver Unit ATU 101 in the access node AN 100 is in this reference model called ATU-C where the 'C' stands for 'Central office'. The corresponding ATU 111 in the NT 110 is called ATU-R where the 'R' stands for 'remote'. The access node AN 100 normally belongs to a network operator and the NT 110 is normally located at the customer's premises. The access node AN 100 is in the telecommunication industry often referred to as a DSLAM Digital Subscriber Line Access Multiplexer, as a plurality of NT's 110 can be connected and a plurality of digital subscriber lines DSL 125 can be multiplexed by the access node AN 100.

For homes with a broadband access, a service that is becoming more and more popular is IPTV. IPTV (Internet Protocol Television) is a system where digital television is delivered from a video server 145 by using the Internet Protocol over the broadband network 140. When a user wants to watch IPTV at his or her TV set 163, a data channel has to be set up between the TV set 163 and the video server 145. These channels are often IP multicast channels. An IP multicast channel is a one-way IP channel from for example the video server 145 to a group of receivers, were one receiver can be the TV set 163 in FIG. 1a.

Figure 1B:
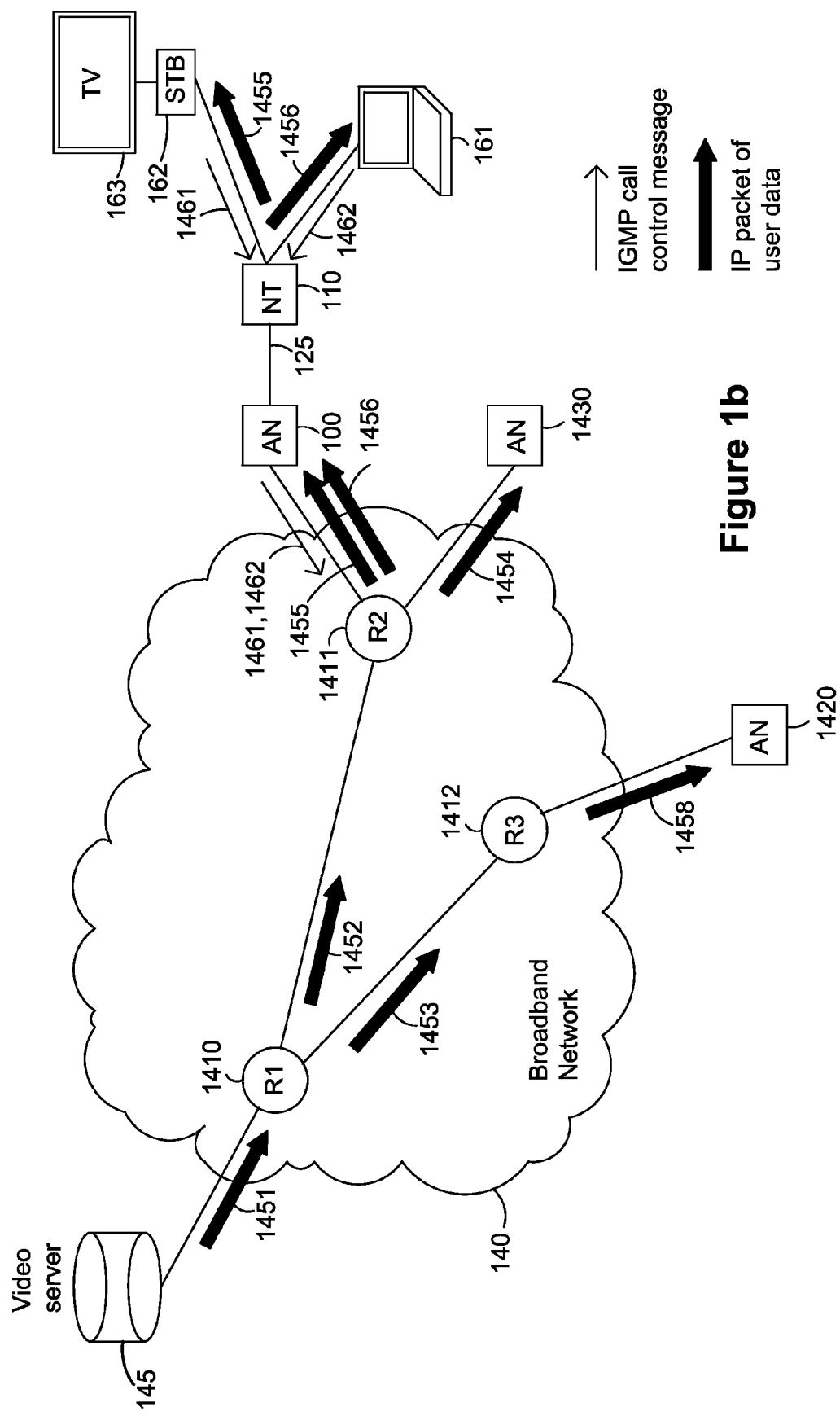
FIG. 1b is a block diagram illustrating multicast connections.

An example on an IP multicast channel is schematically illustrated in FIG. 1b. Each single IP packet 1451 of user data sent from the video server 145 is replicated in a router R1 1410. The router R1 1410 distributes copies 1452, 1453 of the packet 1451 to two other routers R2 1411 and R3 1412. The router R3 1412 in turn replicates the packet 1453 into packet 1458 and router R2 1411 in turn replicates the packet 1452 into packets 1454, 1455 and 1456. Packets 1455 and 1456 are sent to the access node AN 110 which re-distributes them to the receivers 161, 162. Some access nodes AN 100 can be arranged to replicate packets in the same way as the router R2 1411, but this configuration is not shown in FIG. 1b.

The term multicast is used in contrast to the term broadcast. Broadcast basically means that the information is distributed to anybody independently if the receiver cares to listen or not. Multicast on the other hand means basically that only the active listeners are connected. These listeners constitute a so called multicast group. With multicast, unnecessary replication of IP packets in the routers R1-R3 1410-1412 is avoided, thereby saving bandwidth and other resources in the broadband network 140. In order to achieve this, the routers R1-R3 1410-1412 need to know towards which receivers 161, 162 the IP packets have to be replicated. For this purpose, the IGMP (Internet Group Multicast Protocol) has been developed. IGMP exists in three versions 1 to 3 which are specified in the internet standards RFC1112, RFC2236 and RFC3376 respectively.

To join or to leave a multicast group, an IGMP call control message 1461, 1462 is sent from the receiver (the STB 162 and/or the laptop 161) via the access node AN 110 to the router R2 1411 in the broadband network 140. When the router R2 1411 receives the call control message 1461, 1462 it starts or stops the replication of packets to the receiver 161, 162 that sent the message.

When an IP multicast channel towards the receivers 161, 162 has been established, the router R2 1411 periodically sends IGMP query messages (not shown in FIG. 1b) to check if the receivers 161, 162 are still 'interested in' being part of the multicast group.

Returning to FIG. 1a, the problem addressed by the current invention is related to power savings in the digital subscriber line DSL 125. When no or very little user data is sent over the DSL 125, power can be saved in the access node AN 110 by forcing the transceiver ATU-C 101 into a power saving mode.

In the ITU-T Recommendation G.992.3 three different power management states, L0, L2, L3 have been specified. L0 is Full On, which means that the DSL 125 is fully functional. L2 is Low Power which means that the DSL 125 is active but a low power signal conveying background data is sent from the ATU-C 101 to ATU-R 111. A normal data carrying signal is transmitted from the ATU-R 111 to the ATU-C 101. L3 is Idle. In the L3 state there is no signal transmitted in any direction. The transceiver ATU-C 101 can transition from L0 state to L2 state when no or very little data is sent over the DSL 125 or can transition back to L0 state when more user data needs to be sent.

To overcome the problem of disturbing adjacent subscriber lines when transitioning from a low power state to a high power state, the current invention comprises a method and an enhanced communication node to monitor and to detect selected traffic events and to step-wise increase the transmission power in the ATU-C 101 until the high power state has been reached.

Figure 2:
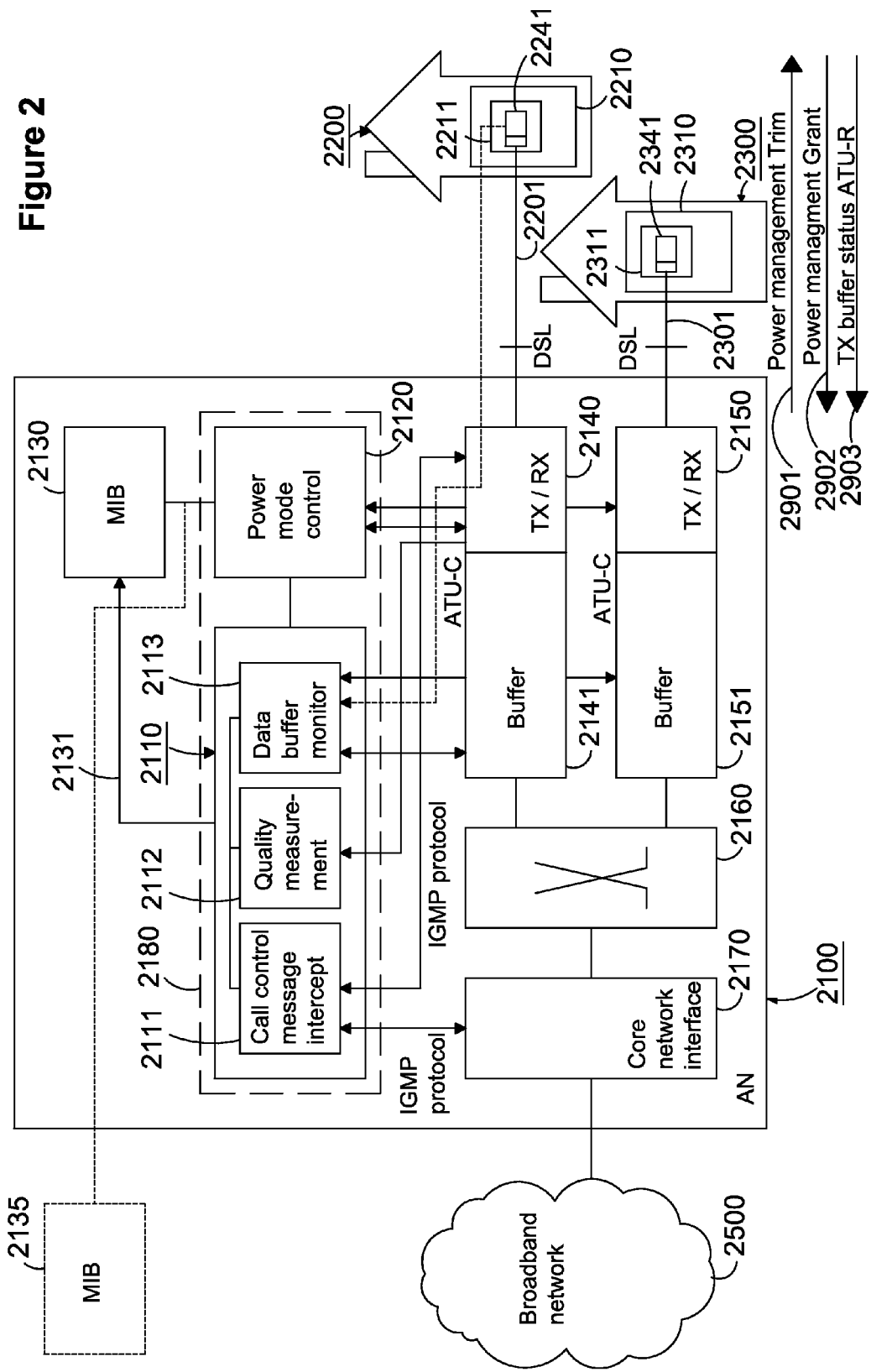
FIG. 2 is a block diagram illustrating an access node according to the current invention.

The enhanced communication node according to the current invention is illustrated in FIG. 2 as an access node AN 2100. The access node AN 2100 is connected to a broadband network 2500 and is serving two residential subscriber premises 2200 and 2300. Each of the premises 2200, 2300 is connected to the access node AN 2100 through a digital subscriber line DSL 2201 and 2301 respectively. The subscriber lines DSL 2201, 2301 terminate in transceivers ATU-C 2140, 2150 in the access node AN 2100 and in transceivers ATU-R 2211, 2311 in NTs 2210, 2310 at the subscriber premises 2200 and 2300. The access node AN 2100 is connected to the broadband network 2500 via a core network interface 2170. This interface 2170 is in turn coupled to a switch or a router 2160 which distributes data packets between the network interface 2170 and the relevant transceiver ATU-C 2140, 2150. For each transceiver ATU-C 2140, 2150 there is a data transmission buffer 2141, 2151 respectively, which serves to cope with variations in the rate of received data packets received from the broadband network 2500.

The access node AN 2100 further comprises a traffic event monitor 2110 arranged to monitor traffic events. The traffic event monitor 2110 comprises one or several different sub-units arranged to monitor different types of traffic events.

A first sub-unit is a call control message intercept unit 2111 that is arranged to monitor and to detect selected call control messages in the IGMP protocol exchanged between the NTs 2210, 2310 and routers in the broadband network 2500. The IGMP protocol consists basically of three types of messages of concern to the NTs 2210, 2310. These message types are Membership Query, Membership Report and Leave Group. When an NT 2210, 2310 requests to join a multicast group it sends a Membership Report to a router in the broadband network 2500 and when it requests to leave the group it sends Leave Group. The intercept unit 2111 is primarily arranged to detect Membership Report messages and Leave Group messages sent from the NT 2210, 2310. This process is also referred to as 'IGMP snooping'. In addition, the intercept unit 2111 has the option to delay selected call control messages (such as the Membership Report message) for a certain period of time. The reason for this will be explained more in detail further below.

A second sub-unit is a quality measurement unit 2112. This unit 2112 measures the noise conditions on the DSL's 2201 and 2301. At certain noise conditions, the sub-unit 2112 can trigger bit-swapping. Bit-swapping is basically a method to change the modulation on the DSL 2201, 2301 in order to reduce the impact of the noise. Bit-swapping is described more in detail in G.992.3 but the trigger to initiate bit-swapping is in the current invention additionally used as a traffic event to initiate the transitioning of the DSL 2201, 2301 from a low to a high transmission power state. As an option, the quality measurement unit 2112 can also be designed to receive requests from the NT's 2210, 2310 to initiate bit-swapping which also can serve as traffic events to initiate the transitioning.

A third sub-unit is a data buffer monitor 2113. The data buffer monitor 2113 monitors the level of the transmission buffers 2141 and 2151 in the ATU-Cs 2140 and 2150 respectively. When a certain threshold in the buffer 2141, 2151 has been reached a traffic event is detected. The data buffer monitor 2113 can also indirectly monitor the threshold in the data transmission buffers 2241, 2341 in the NT 2210, 2310. The traffic event is then when a buffer status message 2903 is received from the NT 2210, 2310.

Traffic events from all three units 2111, 2112 and 2113 can be used independently but can also be combined to form a single traffic event by the traffic event monitor 2110.

The access node AN 2100 further comprises a power mode control unit 2120 arranged to increase or decrease the transmission power level in the ATU-C 2140, 2150 when necessary. The power mode control unit 2120 is also arranged to send power management requests 2901 to and to receive power management responses 2902 from the NT 2210, 2310.

The traffic event monitor 2110 and its different sub-units 2111, 2112, 2113 all comprise a means for monitoring and detecting traffic events. Likewise is the power mode control unit 2120 also a means to increase/decrease the power level and to send power management requests. These means 2180 can be implemented in software or firmware in one or several processor units 6100 as illustrated in FIG. 6. This processor unit 6100 comprises a processor 6110, a memory unit 6150 and one or several i/o units 6120, 6130, 6140 that are connected to the network interface 2170 and the ATU-Cs 2140, 2150 respectively.

The access node 2100 also comprises a Management Information Base MIB 2130 arranged to store power state transitioning parameters which will be described more in detail below. In an alternative embodiment of the access node 2100, the MIB 2130 is replaced by an external MIB 2135 that is connected to the access node AN 2100 and that serves as a common information base for a plurality of access nodes.

Figure 3:
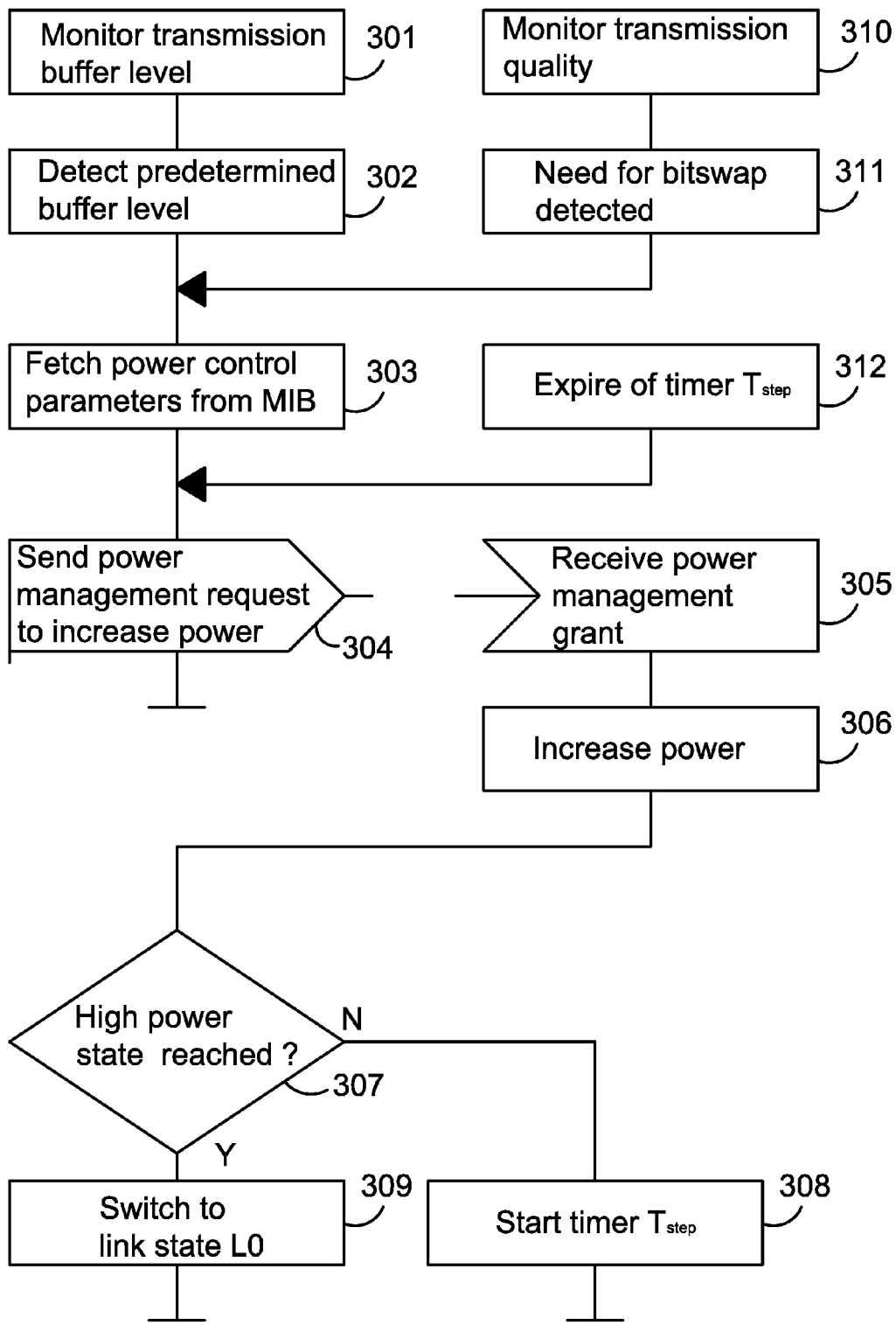
FIGS. 3-5 are flow diagrams illustrating embodiments of the method in the current invention.
Figure 4:
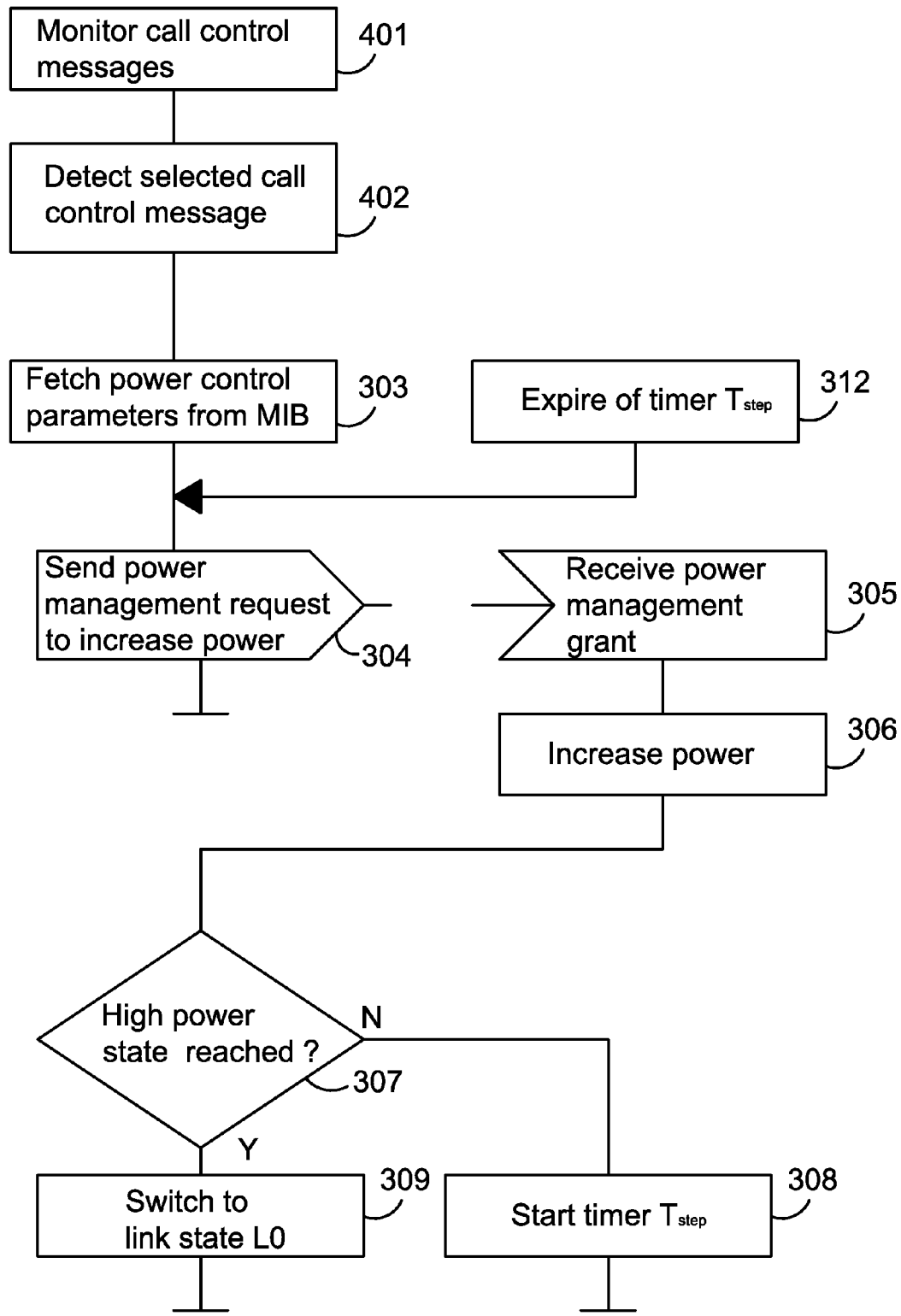
Figure 5:
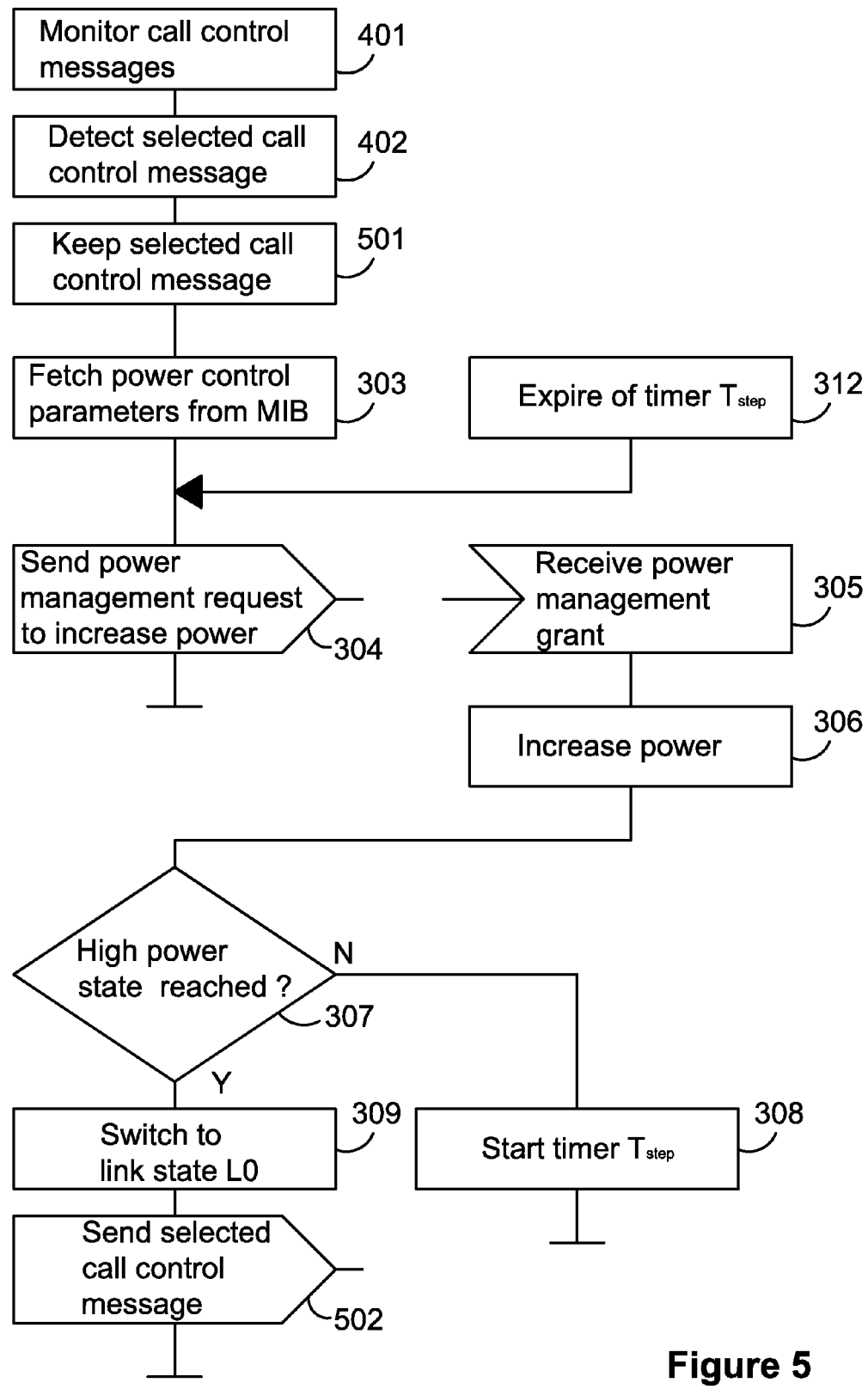

The current invention further comprises a method of transitioning from the low transmission power state (L2 state) to the high transmission power state (L0 state). Different embodiments of the invention comprise methods to detect selected traffic events that give an 'early warning' that a transition is necessary. A transition is normally necessary when the bandwidth on the subscriber lines DSL 2201, 2301 is increased. These embodiments are illustrated by FIG. 3 to FIG. 5.

The process of transitioning from a low transmission power state (L2) to a high transmission power state (L0) on a particular subscriber line DSL 2201 is triggered by a selected traffic event as in any of the steps 302, 311 and 402 in FIGS. 3 to 5 which will be described further below. When triggered, power state transitioning parameters are fetched from a management information base MIB 2130, 2135 in step 303. These state transitioning parameters comprise:
  a power increase step size: L2_EXPI (unit dB).
  a value of the time between two power increase steps: L2_EXTS (unit seconds).
  the current power cutback value in L2 state when the trigger was received: PCBC.
  the power cutback value used in L0 state immediately before L2 state was entered: PCB(L0).

In step 304, a power management request is sent from the ATU-C 2140 in the AN 2100 towards the ATU-R 2211 in the NT 2210. This request is requesting a decrease of the power cutback (i.e. an increase of transmission power) by requesting a new PCB value lower than the actual value by an amount less or equal to L2_EXPI. If the ATU-R 2211 grants the request, it returns a power management grant to the ATU-C 2140 in step 305.

After receiving the power management grant in step 305, the power is increased in step 306, by setting the current power cutback value PCBC to the maximum value of max (PCBC−L2_EXPI, PCB(L0)).

In step 307 the value of PCBC is checked if it equals the value of PCB(L0) (i.e. if the high power state has been reached). If that is not the case, a timer $T_{step}$ is started in step 308 with the value L2_ETXS. When timer $T_{step}$ expires in step 312, steps 304 and 305 are repeated with a new PCB value calculated in the same way as above. If the new value of PCBC equals the value of PCB(L0), a switch to L0 state (i.e. high power state) is performed by the ATU-C 2140 in step 309. In this embodiment, the actual switch to L0 state (step 309) is performed by using the same procedure as disclosed in G.992.3. In addition, the power management request and grant are implemented using L2 power trim messages similar to the power trim messages disclosed in G.992.3.

Using sufficient long time and small subsequent increases of the transmission power, adjacent subscriber lines DSL 2301 have time to adapt to the changing noise condition caused by the power increase in conjunction with crosstalk coupling between the copper pairs.

Again, the transitioning from a low transmission power state to a high transmission power state is triggered by monitoring and detecting a selected traffic event by the traffic event monitor 2110 in the access node AN 2100.

For access nodes AN 2100 with limited data buffers 2141, 2151, there is a risk that these data buffers will overflow if the transitioning takes too long time. In order to reduce this risk the current invention also includes a number of embodiments arranged to give an 'early warning' that a transition is necessary.

In one embodiment illustrated by FIG. 3, the selected traffic event is when the buffer level in the data transmission buffer 2141 in the ATU-C 2140 reaches a certain threshold. The data buffer monitor 2112 monitors the buffer level of the data transmission buffer 2141 in step 301. When a predetermined buffer level has been reached in step 302, the transitioning is triggered. The threshold must be configured so that a data rate of 64-128 kbits/s is allowed without triggering the transitioning from the L2 state to the L0 state. The rate of 64-128 kbits/s is sufficient for carrying background traffic such as DHCP signaling etc.

The data buffer monitor 2112 can optionally receive messages from the ATU-R 2211 requesting a transitioning of the power state. These messages can for example be data transmission buffer status messages 2903 that are sent from the ATU-R 2211 when the data transmission buffer 2241 in the ATU-R 2211 reaches a predetermined threshold. These messages can act as traffic events that trigger the transitioning.

Another option is to extrapolate the buffer fill rate in order to predict when the buffer 2141 in the ATU-C 2140 will become full.

Yet another option is that different types of predetermined buffer levels are monitored. In this option, different buffer levels are defined for different PVCs (Permanent Virtual Channels) and/or for connections with different QoS requirements. The QoS requirement can for example be determined by monitoring IEEE 802.1p priority bits in the Ethernet frames or the Differentiated Services Code Point DSCP in the IP packets.

In a further embodiment the traffic event is when a need for bit-swap is detected. The transmission quality on the subscriber line DSL 2201 is monitored by the quality measurement unit 2112 in step 310. At certain noise conditions, the quality measurement unit 2112 triggers bit-swapping in step 311. The trigger to initiate bit-swapping is in the current invention additionally used as a traffic event to trigger the transitioning of the DSL 2201, 2301 from a low to a high transmission power state. Alternatively, the actual bit-swapping is delayed until the transitioning is completed.

In yet another embodiment, the traffic event is when a selected call control message (i.e. an IGMP message) is received. This embodiment is illustrated by FIG. 4. A call control message, such as an IGMP Membership Report message coming from a host 161, 162 requesting to join a multicast group is an indication that the data rate will increase and that a transitioning from L2 state to L0 state will become necessary. In FIG. 4 the call control message intercept unit 2111 in the access node AN 2100 monitors IGMP messages in step 401. In step 402 the intercept unit 2111 detects an IGMP Membership Report message coming from the host 161, 162 requesting to join a multicast group. The detection of this IGMP message triggers the transitioning. The remaining steps 303-309, 312 in FIG. 4 are described in connection with FIG. 3. As an option (shown in FIG. 5) the intercept unit 2111 delays the retransmit of the IGMP message towards the broadband network 2500 until the transitioning is completed. This is done by keeping in step 501 the IGMP message and retransmitting it in step 502 i.e. not until the transitioning has been completed. By delaying the request to join the multicast group, the risk that the data buffer 2141 will overflow is minimized. The remaining steps 303-309, 312, 401-402 in FIG. 5 are described in connection with FIGS. 3 and 4 respectively.

As an option, the power transitioning parameters listed above are dependant on the used service or protocol type (e.g. TCP, UDP, RTSP). Certain services may require quicker transitioning than others. For example, to avoid disturbance on the video stream of an IPTV service, the transitioning could be performed quicker for the IPTV service than for example Internet web-browsing. To identify the service, the identity of the PVC or the VLAN (Virtual LAN) carrying the service can be used.

As a further option, the transition parameters are dependant on the QoS (Quality of Service) requirements. For example, the IEEE 802.1p priority bits in the Ethernet frames an/or the Differentiated Services Code Point DSCP in the IP packets are monitored. The QoS requirements are fed 2131 into the MIB 2130, 2135 by the traffic event monitor 2110 and different transitioning parameters can be used for connections with different QoS requirements.

The traffic event monitor 2110 is optionally arranged to combine any of the traffic events described above to a single traffic event that triggers the transitioning.

The embodiments described above are basically referring to the ADSL technology and ADSL Transceiver Units 2140, 2150, 2211, 2311. The inventive concept could very well be used for digital communication lines using other DSL techniques such as VDSL, VDSL2 etc.

The invention claimed is:

1. A first communication node configured to communicate with at least one second communication node over at least one operational digital communication line, wherein the first communication node comprises:
   a traffic event monitor comprising a call control message intercept unit that monitors received call control messages, wherein the traffic event monitor is configured to:
      monitor traffic events, and
      detect a selected traffic event, and
   a power mode control unit configured to send to the second communication node, in response to detection of the selected traffic event, a plurality of requests to increase the transmission power of the at least one operational digital communication line in the first communication node in a series of steps from a low transmission power state to a high transmission power state in the digital communication line.

2. The first communication node as in claim 1 further comprising a transceiver connected to the digital communication line and having a transmission data buffer, and where the traffic event monitor also includes a data buffer monitor configured to monitor the buffer level in the transmission data buffer.

3. The first communication node as in claim 1 where the traffic event monitor also includes a data buffer monitor arranged to receive transmission buffer status messages from the second communication node.

4. The first communication node as in claim 1 where the traffic event monitor also includes a quality measurement unit configured to detect when bit swapping on the digital communication line is needed.

5. The first communication node as in claim 1 where the call control message intercept unit is further arranged to delay selected call control messages until the high transmission power state has been reached.

6. The first communication node as in claim 1 further comprising a management information base (MIB) configured to store power state transitioning parameters.

7. The first communication node as in claim 1 further configured to connect to an external management information base MIB configured to store power state transitioning parameters.

8. A method in a first communication node, comprising:

monitoring traffic events;

detecting a selected traffic event, wherein the selected traffic event is receipt of a selected call control message;

in response to detection of the selected traffic event, sending from the first communication node to a second communication node, a request to increase the transmission power level of at least one operational digital communication line operating at a low power state in the first communication node to a higher intermediate power state;

receiving a grant from the second communication node;

increasing the transmission power level of the at least one operational digital communication line in the first communication node to the higher intermediate power state; and repeating at least once, the steps of sending the request, receiving the grant, and increasing the transmission power level until a high transmission power state has been reached for the at least one operational digital communication line.

9. The method as in claim 8 further comprising delaying the sending of the received selected call control message until the high transmission power state has been reached.

10. The method as in claim 8 where the selected call control message is a request to join a multicast group.

11. The method as in claim 8 further comprising the step of:
fetching from a management information base, the new power value and a value of a time period between sending two consecutive requests.

12. The method as in claim 11 where the new power value comprises a power cutback value and where the unit of the value is in dB.

13. The method as in claim 12 where the request is a power management trim message and the grant is a power management grant message.

14. A non-transitory computer-readable medium having a computer-readable program stored thereon for operating on a processor of a first communication node, wherein the program comprises instructions that cause the first communication node to perform the following steps when the processor executes the program:

monitoring traffic events;

detecting a selected traffic event, wherein the selected traffic event is receipt of a selected call control message;

in response to detection of the selected traffic event, sending from the first communication node to a second communication node, a request to increase the transmission power level of at least one operational digital communication line operating at a low power state in the first communication node to a higher intermediate power state;

receiving a grant from the second communication node;

increasing the transmission power level of the at least one operational digital communication line in the first communication node to the higher intermediate power state; and repeating at least once, the steps of sending the request, receiving the grant, and increasing the transmission power level until a high transmission power state has been reached for the at least one operational digital communication line.

* * * * *

UNITED STATES PATENT AND TRADEMARK OFFICE
CERTIFICATE OF CORRECTION

PATENT NO. : 9,313,137 B2
APPLICATION NO. : 14/055504
DATED : April 12, 2016
INVENTOR(S) : Kölhi et al.

It is certified that error appears in the above-identified patent and that said Letters Patent is hereby corrected as shown below:

In the specification

Column 1, Line 9, delete "2010," and insert -- 2010, now Pat. No. 8,699,363, --, therefor.

Column 3, Line 64, delete "AN 110" and insert -- AN 100 --, therefor.

Column 4, Line 18, delete "AN 110" and insert -- AN 100 --, therefor.

Column 4, Line 31, delete "AN 110" and insert -- AN 100 --, therefor.

Column 6, Line 1, delete "i/o units" and insert -- I/O units --, therefor.

Column 7, Line 12, delete "monitor 2112" and insert -- monitor 2113 --, therefor.

Column 7, Line 20, delete "monitor 2112" and insert -- monitor 2113 --, therefor.

Column 8, Line 17, delete "an/or" and insert -- and/or --, therefor.

In the claims

Column 8, Line 58, Claim 3, delete "arranged" and insert -- configured --, therefor.

Column 8, Line 65, Claim 5, delete "arranged" and insert -- configured --, therefor.

Signed and Sealed this
Fifth Day of July, 2016

Michelle K. Lee
*Director of the United States Patent and Trademark Office*